United States Patent Office 3,268,469
Patented August 23, 1966

3,268,469
TERPOLYMER DISPERSIONS FOR
TEXTILE COATING
Rudolf Muller and Erwin Heinrich, Marl, Kreis Recklinghausen, Germany, assignors to Chemische Werke Huls Aktiengesellschaft, Kreis Recklinghausen, Germany, a corporation of Germany
No Drawing. Filed Oct. 19, 1962, Ser. No. 231,863
Claims priority, application Germany, Feb. 16, 1962, C 26,251
6 Claims. (Cl. 260—29.6)

The known mixed polymerizates of vinyl compounds and tert.-butylacrylamide have already been used in water-soluble form as coating and thickening agents or for cosmetic purposes (DAS 1,110,422; DAS 1,102,401; DAS 1,087,807; DPB 1,095,467). The mixed polymerizates have been used also as film and lacquer stock (DAS 1,098,203; DAS 1,097,681). The mixed polymerizates known heretofore have proven to be poorly suited for use for textile coating because of their low adhesiveness and brittleness. For this purpose highly concentrated, stable dispersions of synthetic plastics are required which must also be compatible with the pigment used. Heretofore it has not been possible to produce stable, concentrated pigment-compatible mixed polymerizate dispersions based upon tert.-butylacrylamide by emulsion polymerization because after only limited reaction or after the addition of pigment the polymers precipitate.

It has now been found that highly concentrated, stable mixed polymerizates (terpolymers) dispersions which are suitable for textile coating can be made by emulsion polymerization of tert.-butylacrylamide and vinyl compounds provided that the mixture which is polymerized consists of from 25 to 90 percent by weight of tert.-butylacrylamide and from 75 to 10 percent by weight of a mixture consisting of from 100 to 25 percent by weight of vinylpropionate, 0 to 10 percent of divinylbenzene and 0 to 75 percent by weight of another vinyl compound of the group consisting of vinyl-chloride, acrylonitrile, styrene, acrylic acid ester, methacrylic acid ester and vinyl-acetate. The amounts of the monomers can be varied within the specified ranges to vary the properties of the mixed polymerizates. For example the K value of the mixed polymerizates (terpolymers) in the dispersion increases with increasing proportion of the tert.-butyl-acrylamide and the elasticity of the mixed polymerizate can be increased by increasing the content of vinylpropionate. The introduction of the divinylbenzene which is known to be a cross-linking agent increases the solvent resistance of the mixed polymerizates. The cross-linking agent advantageously is used in amounts within the range from 0.5 to 2.0 percent by weight calculated upon the combined weights of the vinylpropionate and any other vinylcompound present in the monomer mixture.

The polymerization is carried out in known manner in emulsions which may contain cationic, anionic or non-ionic emulsifying agents. It is advantageous to carry out the polymerization in the presence of an inert gas such as nitrogen and under exclusion of air or oxygen. Radical formers such as organic peroxide, hydroperoxide or persalt may be used as polymerization initiator. The addition is made in the known manner according to the desired progress of the reaction or the desired properties of the polymerizate. In addition to the mentioned catalysts so-called activators may be used and if expedient the reaction can be carried out in the presence of a reducing agent such as sodium bisulfite. The reaction generally is carried out at elevated temperature but can be carried out at room temperature with redox systems. A suitable temperature range is 40–100° C. and especially 50–80° C. and in some cases it is expedient to carry out the polymerization at a lower temperature at the beginning and at a higher temperature at the end. The phase ratio of the organic phase to the aqueous phase suitably is within the range from 1 to 1 to 2 to 3. Stable dispersions are formed by the polymerization which do not show any tendency to precipitate after long storage. The polymerizate content of the dispersions amounts to 40% by weight or more. The polymerization gives a quantitative reaction of the monomers used so that the content of tert.-butylacrylamide in the mixed polymerizate corresponds to the amount used.

The dispersions produced are compatible with the usual pigments and are especially adapted for use as dressing or finishing agents for various kinds of textiles. They may even be used for the treatment of fiber fleeces. They impart a strong grip to the textiles to be treated whereby as compared with butadiene-styrene mixed polymerizate dispersions heretofore used for this purpose they have the advantage that the result can be obtained with a significantly smaller thickness of the coating film. Especially, however, they have the advantage that they do not form any deposit upon the pad rolls of the apparatus. Moreover no noticeable yellowing of the textile support occurs and due to their saturated character it possesses an advantageous ageing resistance as compared with the butadiene-mixed polymerizates.

*Example 1*

5 parts by weight of the alkyl sulfonates available under the trade name Mersolat [Kirk-Othmer, Encyclopedie of Chemical Technology, volume 13, page 324 (1954)] are dissolved in 150 parts by weight of water in a flask equipped with a stirrer under an atmosphere of nitrogen and 50 parts by weight of tert.-butylacrylamide and 50 parts by weight of vinylpropionate are added. After the further addition of 0.3 part by weight of potassium persulfate the batch is polymerized for 20 hours at 60° C. The resulting dispersion has a mixed polymerizate content of 40% which corresponds to a 100% conversion of the monomers. The K-value of the isolated and dried polymerizate, measured at 25° C. in benzene is 66.0. The content of tert.-butylacrylamide in the mixed polymerizate corresponds to the amount used. The dispersion is stable and can be stored without change.

*Example 2*

25 parts by weight of tert.-butylacrylamide and 75 parts by weight of vinylpropionate are polymerized by the procedure described in Example 1. The result is a stable dispersion having a mixed polymerizate content of 40%. The K-value of the separated and dried mixed polymerizate, measured in benzene at 25° C. is 63.0.

*Example 3*

75 parts by weight of tert.-butylacrylamide and 25 parts by weight of vinylpropionate are polymerized under the same conditions as in Example 1. The resulting stable dispersion has a polymerizate content of 40%. The K-value of the separated and dried mixed polymerizate measured in benzene at 25° C. is 70.

*Example 4*

5 parts by weight of alkylsulfonates available under the trade name Mersolat are dissolved in 150 parts by weight of water in a vessel equipped with a stirrer and to the resulting solution are added 25 parts by weight of tert.-butylacrylamide, 73 parts by weight of vinylpropionate and 2 parts by weight of divinylbenzene. The polymerization is carried out under the exclusion of air and with the addition of 0.3 part by weight of potassium persulfate at 60° C. After 20 hours the monomers are quantitatively reacted which corresponds to a polymerizate content of 40% in the dispersion. By the copolymerization of the two parts by weight of divinylbenzene the solvent resistance of the mixed polymerizate is increased.

*Example 5*

25 parts by weight of tert.-butylacrylamide, 40 parts by weight of vinylacetate and 35 parts by weight of vinylpropionate are introduced into a solution of 5 parts by weight of alkylsulfonates available under the trade name Mersolat in 150 parts by weight of water in a vessel equipped with a stirrer. The polymerization is carried out in the presence of 0.3 part by weight of potassium persulfate for 10 hours at 45 to 50° C. and then for 10 hours at 60° C. The result is a quantitative conversion of the monomers which corresponds to a polymerizate content in the dispersion of 40%. The dispersion is stable.

*Example 6*

A mixture of 25 parts by weight of tert.-butylacrylamide, 40 parts by weight of vinylpropionate and 35 parts by weight of acrylic acid ethyl ester is polymerized under the conditions described in Example 5. The result is a stable dispersion having a polymerizate content of 40%.

We claim:
1. Process for the production of a highly concentrated stable dispersion suitable for textile coating which comprises polymerizing a mixture consisting essentially of 25 parts by weight of tert.-butylacrylamide, 73 parts by weight of vinylpropionate and 2 parts by weight of divinylbenzene in an aqueous emulsion, the phase ratio of the organic phase to the aqueous phase in said emulsion being within the range from 1 to 1 to 2 to 3.
2. Process for the production of a highly concentrated stable dispersion suitable for textile coating which comprises polymerizing a mixture consisting essentially of 25 parts by weight of tert.-butylacrylamide, 40 parts by weight of vinylacetate and 35 parts by weight of vinylpropionate in an aqueous emulsion, the phase ratio of the organic phase to the aqueous phase in said emulsion being within the range from 1 to 1 to 2 to 3.
3. Process for the production of a highly concentrated stable dispersion suitable for textile coating which comprises polymerizing a mixture consisting essentially of 25 parts by weight of tert.-butylacrylamide, 40 parts by weight of vinylpropionate and 35 parts by weight of acrylic acid ethyl ester in an aqueous emulsion, the phase ratio of the organic phase to the aqueous phase in said emulsion being within the range from 1 to 1 to 2 to 3.
4. A highly concentrated, stable dispersion suitable for textile coating, said dispersion consisting essentially of an aqueous liquid and a terpolymer of 25 parts by weight of tert.-butylacrylamide, 73 parts by weight of vinylpropionate and 2 parts by weight of divinylbenzene, said dispersion containing about 40% by weight of said terpolymer.
5. A highly concentrated, stable dispersion suitable for textile coating, said dispersion consisting essentially of an aqueous liquid and a terpolymer of 25 parts by weight of tert.-butylacrylamide, 40 parts by weight of vinyl acetate and 35 parts by weight of vinylpropionate, said dispersion containing about 40% by weight of said terpolymer.
6. A highly concentrated, stable dispersion suitable for textile coating, said dispersion consisting essentially of an aqueous liquid and a terpolymer of 25 parts by weight of tert.-butylacrylamide, 40 parts by weight of vinylpropionate and 35 parts by weight of acrylic acid ethyl ester, said dispersion containing about 40% by weight of said terpolymer.

References Cited by the Examiner

FOREIGN PATENTS

| | | |
|---|---|---|
| 1,097,681 | 3/1961 | Germany. |
| 1,098,203 | 7/1961 | Germany. |
| 1,102,401 | 3/1962 | Germany. |

MURRAY TILLMAN, *Primary Examiner.*

N. F. OBLON, *Assistant Examiner.*